US012607748B2

(12) United States Patent
Lammel et al.

(10) Patent No.: US 12,607,748 B2
(45) Date of Patent: Apr. 21, 2026

(54) USE OF THE LIDAR MEASUREMENT PRINCIPLE IN PROCESS TECHNOLOGY

(71) Applicant: Endress+Hauser Conducta GmbH+Co. KG, Gerlingen (DE)

(72) Inventors: Eric Lammel, Leipzig (DE); Torsten Pechstein, Radebeul (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 1002 days.

(21) Appl. No.: 17/557,378

(22) Filed: Dec. 21, 2021

(65) Prior Publication Data

US 2022/0196837 A1 Jun. 23, 2022

(30) Foreign Application Priority Data

Dec. 21, 2020 (DE) ..................... 10 2020 134 520.8

(51) Int. Cl.
*G01S 17/88* (2006.01)
*A01K 61/90* (2017.01)
(Continued)

(52) U.S. Cl.
CPC .............. *G01S 17/88* (2013.01); *A01K 61/90* (2017.01); *B65G 43/00* (2013.01); *G01N 21/89* (2013.01);
(Continued)

(58) Field of Classification Search
CPC .......... G01S 17/88; G01S 17/10; G01S 17/86; G01S 17/08; G01S 17/89; A01K 61/90;
(Continued)

(56) References Cited

U.S. PATENT DOCUMENTS 11,074,447 B1* 7/2021 Fox ........................... G08G 5/55
2005/0257748 A1 11/2005 Griffin et al.
(Continued)

FOREIGN PATENT DOCUMENTS

CN 106643529 A1 5/2017
CN 108931611 A 12/2018
(Continued)

OTHER PUBLICATIONS

Li, Y., Fan, X., Mitra, N. J., Chamovitz, D., Cohen-Or, D., & Chen, B. (2013). Analyzing growing plants from 4D point cloud data. ACM Transactions on Graphics, 32(6), 1-10. https://doi.org/10.1145/2508363.2508368 (Year: 2013).*
(Continued)

*Primary Examiner* — John Villecco
*Assistant Examiner* — Kyla Guan-Ping Tiao Allen
(74) *Attorney, Agent, or Firm* — Mark A. Logan; Endress+Hauser (USA) Holding, Inc.

(57) ABSTRACT

The present disclosure relates to a method for operating a measuring point in process engineering, wherein at least one Lidar (light detection and transmission) system is used at the measuring point, comprising: acquiring spatial information from the surroundings of the measuring point by means of the Lidar system; extracting object information from the spatial information; and reconstructing and identifying objects on the basis of the object information and associating the object information with the reconstructed and identified objects.

6 Claims, 2 Drawing Sheets

(51) Int. Cl.

| | |
|---|---|
| *B65G 43/00* | (2006.01) |
| *G01N 21/89* | (2006.01) |
| *G01S 17/10* | (2020.01) |
| *G01S 17/86* | (2020.01) |

(52) U.S. Cl.

CPC .............. *G01S 17/10* (2013.01); *G01S 17/86* (2020.01); *B65G 2201/04* (2013.01); *B65G 2203/042* (2013.01)

(58) Field of Classification Search

CPC ................ B65G 43/00; B65G 2201/04; B65G 2203/042; G01N 21/89

See application file for complete search history.

(56) References Cited

U.S. PATENT DOCUMENTS

| | | | | |
|---|---|---|---|---|
| 2006/0178762 | A1* | 8/2006 | Wroblewski | G05B 13/027 |
| | | | | 700/36 |
| 2016/0093101 | A1* | 3/2016 | Benedek | G06V 20/64 |
| | | | | 345/420 |
| 2019/0124914 | A1* | 5/2019 | Sørensen | G01S 7/4816 |
| 2019/0299254 | A1* | 10/2019 | Justice | B07C 5/342 |
| 2020/0041649 | A1* | 2/2020 | Green | G01S 7/4808 |
| 2020/0309923 | A1* | 10/2020 | Bhaskaran | G01S 17/87 |
| 2020/0359550 | A1* | 11/2020 | Tran | G06Q 30/0206 |

FOREIGN PATENT DOCUMENTS

| | | | | | |
|---|---|---|---|---|---|
| CN | 109788748 | A | 5/2019 | | |
| CN | 209560086 | U | 10/2019 | | |
| CN | 209803822 | U1 | 12/2019 | | |
| CN | 111708042 | A1 | 9/2020 | | |
| CN | 111724558 | A | 9/2020 | | |
| DE | 102012108460 | A1 | 3/2014 | | |
| DE | 102018215051 | B3 | 10/2019 | | |
| EP | 2288937 | B1 | 3/2016 | | |
| KR | 102048193 | B1 * | 1/2022 | .............. | B25J 11/00 |

OTHER PUBLICATIONS

Jordt, A., Zelenka, C., Von Deimling, J. S., Koch, R., & Koser, K. (Dec. 5, 2015). The bubble box: Towards an automated visual sensor for 3D analysis and characterization of Marine Gas Release Sites. MDPI. https://www.mdpi.com/1424-8220/15/12/29825 (Year: 2015).*

Kawaguchi, T., Akasaka, Y., & Maeda, M. (Feb. 8, 2002). Size measurements of droplets and bubbles by advanced interferometric laser imaging technique. Measurement Science and Technology. https://iopscience.iop.org/article/10.1088/0957-0233/13/3/312/pdf (Year: 2002).*

* cited by examiner

USE OF THE LIDAR MEASUREMENT PRINCIPLE IN PROCESS TECHNOLOGY

CROSS-REFERENCE TO RELATED APPLICATION

The present application is related to and claims the priority benefit of German Patent Application No. 10 2020 134 520.8, filed on Dec. 21, 2020, the entire contents of which are incorporated herein by reference.

TECHNICAL FIELD

The present disclosure relates to a method for operating a measuring point in process engineering, wherein at least one Lidar (light detection and ranging) system is used at the measuring point.

BACKGROUND

In process engineering, measuring devices are frequently employed which are used, for example, for pressure and temperature measurement, conductivity measurement, flow measurement, pH measurement, fill-level measurement, etc. and which detect the corresponding process variables of pressure, temperature, conductivity, pH value, fill level, flow, etc. A plurality of such measuring devices is produced and marketed by the Endress+Hauser group.

In process engineering, single-point measurements are used for various measurement tasks. For example, the fill level of a filling material in a container is determined by means of a fill-level measuring device according to the radar principle. As an alternative to radar-based fill-level measurements, patent applications DE 10 2012 108 462 A1 and DE 10 2013 114 737 A1 disclose carrying out the detection of fill level in a laser-based manner. However, irrespective of the technology used, the fill level is determined only by means of a single reflection path. It is disadvantageous in this case that an accurate statement about the volume of the filling material located in the container can be made precisely only in the case of a flat surface of the filling material, for example in a water tank. However, if the surface is, for example, relief-like, for example in a grain silo, no precise statement can be made about the volume of the filling material in the container.

The previously used single-point measuring systems, which cannot detect spatially distributed information, are also disadvantageous for solving further measurement tasks. The following non-exhaustive list lists some applications and their disadvantages:

In previous systems used for sludge-level measurement, the sedimentation process can only be monitored at one point or with several devices at several points.

In previous systems used to determine the size of aquatic organisms, for example in fish tanks, it is intended that the organisms be removed and weighed or measured individually.

In previous systems used to determine gas content, the proportion of gas bubbles can only be determined indirectly via density. In addition, for this purpose the medium must be known.

SUMMARY

The present disclosure is thus based on the object of overcoming the disadvantages of single-point measuring systems and detecting spatially distributed information at a measuring point.

The object is achieved by means of a method for operating a measuring point in process engineering, wherein at least one Lidar (light detection and ranging) system is used at the measuring point, comprising:

acquiring spatial information from the surroundings of the measuring point by means of the Lidar system;

extracting object information from the spatial information; and reconstructing and identifying objects on the basis of the object information and associating the object information with the reconstructed and identified objects.

Lidar (light detection and ranging) systems for mapping land or sea-bed surfaces or for collision warning systems, for example in factory automation and in autonomous driving systems, are known. A Lidar system operates on the functional principle of laser distance measurement and scans its surroundings, or the irradiation region, in particular in a grid pattern. A surface image of a larger surface or of a spatial area of the surroundings of the Lidar system is thus obtained. The wavelength of the laser used depends on the intended range of application or on the surroundings of the Lidar system. For example, for air as surrounding medium a laser having a wavelength in the near-infrared range is used. The advantage of Lidar over other emittive measuring methods, such as sonar and radar, is that a laser can be emitted more directionally, which enables a high spatial resolution of the imaging.

According to the present disclosure, the Lidar system scans its surroundings and obtains spatial information. This spatial information is generated in particular by the propagation time of the laser, as the time between emission of the laser beam at the Lidar system and reception of the reflection of the laser beam at the surroundings, and supplies information as to the distance at which objects of the surroundings are located from the Lidar system. The spatial information is subsequently analyzed for the purpose of detecting object information. The object information is a subset of the spatial information and differs from the other spatial information, for example, in such a way that it describes a distance that is many times closer than the remaining surroundings and/or has sharp contours with respect to the remaining surroundings. Objects are subsequently reconstructed which, for example, resemble in shape and/or size the shapes and/or sizes that can be gathered from the object information. After identification or reconstruction of the objects, the objects are assigned to the object information so that, for example, changes over time can be detected and associated. For example, geometric shapes and sizes of objects as well as the relative spatial position of the objects in relation to the Lidar system can be acquired from the object information.

The methods according to the present disclosure thus make it possible to detect the surroundings of a measuring point. A plurality of applications in the field of process engineering is made possible by means of the data acquired or obtained thereby.

An advantageous development of the method according to the present disclosure provides that the method furthermore comprises:

repeating the aforementioned method steps at prespecified time intervals and recording the time curve of the object information for each of the reconstructed and identified objects, in particular their change in spatial position, quantity, shape, and/or size over time;

analyzing the time curve of the object information; and determining a prediction based on the analysis of the time curve of the object information and/or determining, and in particular carrying out, at least one action based on the analysis of the time curve of the object information and/or on the prediction.

Associating the object information with the objects makes it possible to record and track changes of the objects over time. For this purpose, the object information is newly acquired at regular time intervals.

The time curve or the object information itself can be connected in a data memory implemented in the Lidar system, or in an external unit, especially, in a higher-level system connected to the Lidar system, for example a cloud, a control unit, or the control room. The prediction or the proposal of an action is offered and presented to the user, especially, on the external unit.

An advantageous embodiment of the method according to the present disclosure provides that an AI algorithm is used for reconstructing and identifying the objects, for analyzing the time curve of the object information, and/or for determining the action or the prediction.

The AI algorithm is learned beforehand by means of training data. The training data comprise, for example, object information regarding known objects, on the basis of which the identification of the objects is made possible, as well as defined time curves of objects correlated with corresponding predictions and/or actions to be taken, depending on the specific application of the Lidar system. The AI algorithm may, for example, be designed as a neural network or be based on a deep learning or similarly suitable method. The AI algorithm may either be implemented and executed in the Lidar system itself or, as already described with respect to the recording of the object information, may be stored and executed externally.

As a result of the much greater information content in comparison to single-point measurements, Lidar systems can open up new applications. Four advantageous exemplary embodiments are described below:

An advantageous embodiment of the method according to the present disclosure provides that the object information be enriched with information from at least one further sensor system, in particular a camera or a radar system. This facilitates in particular the initial identification and differentiation of the objects. The further sensor system may be part of the Lidar system or be externally arranged and in communication with the Lidar system.

A first variant of the method according to the present disclosure provides that the measuring point be a measuring point used in aquaculture, wherein the objects are aquatic organisms, and wherein the object information concerns the size and/or the number and/or an average value of the size or of the number of aquatic organisms. This may concern, for example, a fish farm in which a large number of fish is bred. The Lidar system is placed and arranged underwater in such a way that spatial information concerning the entire breeding basin can substantially be detected.

An advantageous embodiment of the first variant of the method according to the present disclosure provides that the prediction contains information about the increase or decrease in the number of aquatic organisms or about the average value of the number of aquatic organisms. In this way not the stock quantity of the fish stock and its change over time can be determined in a simple manner, but the growth of the fish can additionally be observed over time on the basis of the average size.

It may furthermore be provided that on the basis of the time curve actions are suggested to the aquaculture operator, for example to increase or reduce the food supply and/or the food quantity and/or to increase or reduce the water temperature.

A second variant of the method according to the present disclosure provides that the measuring point be a measuring point used in precision farming, wherein the objects are agricultural products, especially, crops or animals, and wherein the object information concerns the size and/or the number of agricultural products. The Lidar system is placed and arranged in such a way that all relevant spatial information for detecting all agricultural products can substantially be acquired.

An advantageous embodiment of the second variant of the method according to the present disclosure provides that the prediction contains information about the increase or decrease in the number of agricultural products or about the average value of the number of agricultural products. Not the stock quantity of the agricultural products and its change over time can be determined in a simple manner, but the growth of the agricultural products can additionally be observed over time on the basis of the average size.

It may furthermore be provided that on the basis of the time curve actions are suggested to the operator of the measuring point, for example to increase or reduce the water supply and/or to increase or reduce the food supply or fertilizer supply.

A third variant of the method according to the present disclosure provides that the measuring point be located in a process plant with at least one plant component, in particular a container, a channel, an open basin, and/or a pipe, and wherein the objects are phase boundaries of at least two different media or of at least two media with different optical densities, and wherein the object information is a content of gas bubbles or of solids. Both the change over time of the content of gas bubbles or of solids and the local change in the gas bubbles or sediments can be detected.

An advantageous embodiment of the third variant of the method according to the present disclosure provides that the prediction contains a degree of change in a process quality, for example when an increase in gas bubbles occurs or more sediments are detected in the medium. It may, for example, be provided to make available to the operator of the process plant information that an action for maintaining or influencing the process is to be carried out, for example cleaning a pipe.

A fourth variant of the method according to the present disclosure provides that the measuring point be used in a conveyor system, and wherein the objects concern anomalies in bulk materials, in particular defective bulk material or foreign objects. One possible application is fruit harvesting, in which fruit harvested by machines is transported on a conveyor belt, wherein sections of the conveyor belt are captured by means of the Lidar system. This makes it possible, for example, to detect stones or animals as foreign objects.

According to an advantageous embodiment of the fourth variant of the method according to the present disclosure, it is provided that the action to be taken is to determine and remove the anomaly, where the position of the anomaly is indicated. The action may be carried out independently by corresponding system components (e.g., robot systems in the form of gripper arms or hatches) or presented to a user, for example in the form of an alarm message.

An advantageous embodiment of the first variant or of the second variant of the method according to the present disclosure provides that the prespecified time interval is in the order of magnitude of one hour up to several days. In the described applications (aquaculture, agricultural application), changes are less time-critical or small rates of change are present so that a low measurement frequency can be selected. In such applications, it is possible for the Lidar system to be operated with a limited energy source, for example, a battery or an accumulator, on account of the low energy requirement due to the low measurement rate.

An advantageous embodiment of the third variant or of the fourth variant of the method according to the present disclosure provides that the prespecified time interval is in the order of magnitude of 0.1 ms to 10 s. The production and movement of gas bubbles or the displacement of phase boundaries is in particular highly dynamic so that a sufficiently high measurement rate must be selected. Modern Lidar systems support measurement rates up to several kHz.

BRIEF DESCRIPTION OF THE DRAWINGS

The present disclosure is explained in greater detail with reference to the following figures. These show.

DETAILED DESCRIPTION

Nowadays, Lidar systems 11, 11' have become affordable and miniaturizable so that they can also be used advantageously as sensor technology for process engineering. Due to the substantially greater information content in comparison to single-point measurements, new applications can be opened up in process engineering.

Figure 1:
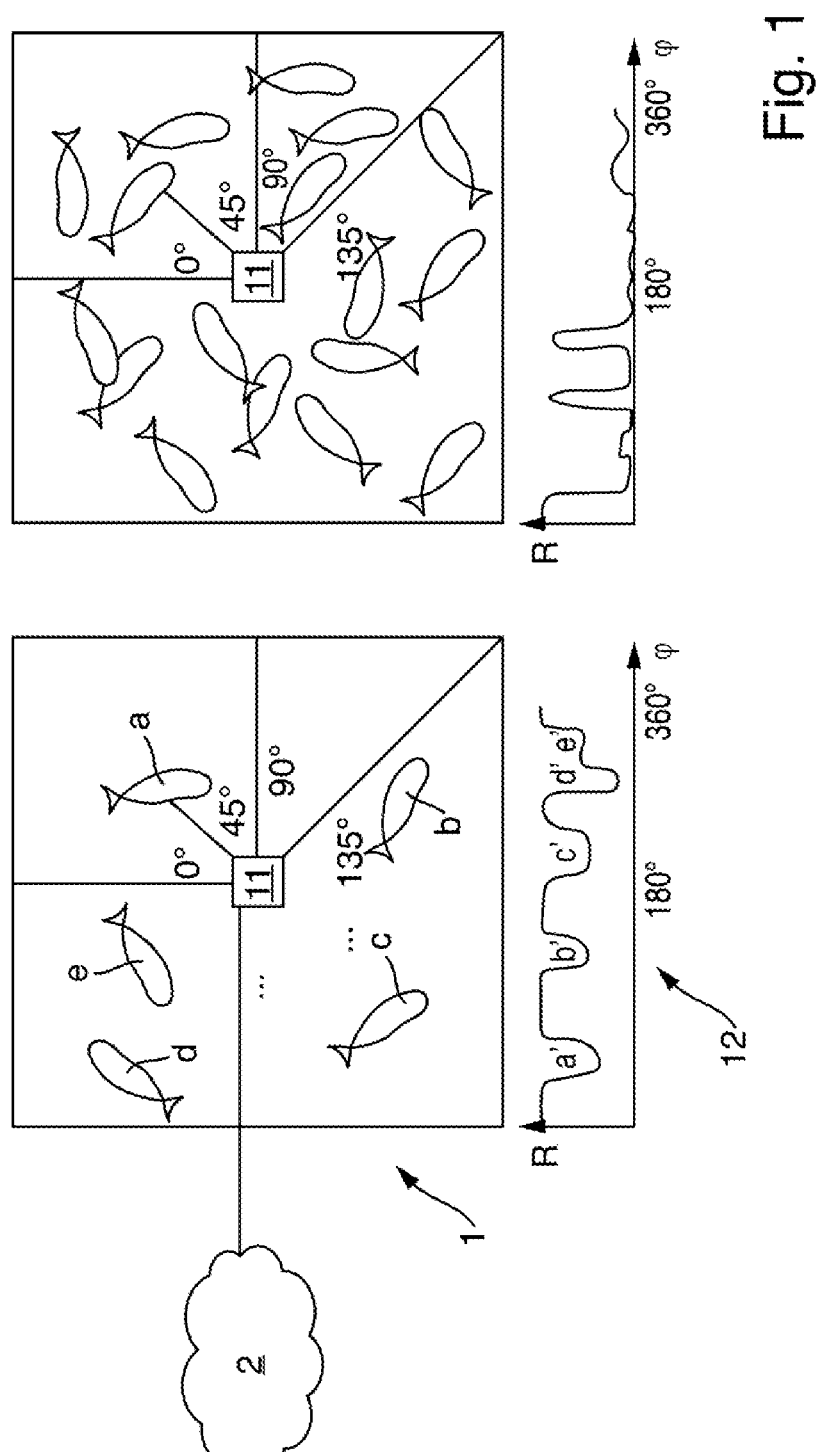
FIG. 1 shows a first exemplary embodiment of the method according to the present disclosure.

A non-conclusive list of such application examples follows:

FIG. 1, left side, shows an application at a measuring point 1 in an aquacultural installation. Specifically, it is a tank in a fish farm in which a plurality of fish a, b, c, d, e are located underwater so that they can only be seen with difficulty and counted by operator personnel. For this reason, a Lidar system 11 in the form of a probe is placed centrally in the tank.

The Lidar system 11 is designed in such a way that it can detect its surroundings all round. For this purpose, the Lidar system emits a laser beam which is reflected at the surroundings and back to the Lidar system 11. On the basis of the reflection R, the Lidar system 11 can determine the distance from the surroundings. The Lidar system 11 can move the laser beam in a 360° circular movement to the starting position, for example by means of a movable mirror mechanism. The intensity of the reflections within the circular movement is recorded and referred to as spatial information 12. FIG. 1, bottom left, presents an example of such spatial information 12. It shows the intensity of the reflections R at the respective angle φ in the circular path. For the sake of simplicity, it is assumed here that the height of the laser beam remains the same and that the laser beam is moved in a horizontal 360° circular path. In reality however the height is also varied so that the entire surroundings of the Lidar system are ideally captured in a spherical shape.

Via a wired or wireless network, for example a LAN or the internet, the Lidar system 11 is in communication with an external unit 2, for example a cloud, and is designed to transmit the acquired spatial information 12 via the established communication link to the external unit 2. A logic controller implemented in the external unit, for example an AI algorithm, analyzes the spatial information 12 and extracts object information a', b', c', d', e'. This object information a', . . . , e' can be seen in the diagram in the form of dips in the measurement curve of the reflections R. The logic controller then recognizes or identifies the fish a, . . . , e as objects, on the basis of empirical values, for example. On the basis of the properties of the object information a', . . . , e', the logic controller can make a statement not only about the quantity of fish a, . . . , e but also about size or weight. Alternatively, the logic controller is implemented in the Lidar system 11 such that the Lidar system 11 carries out the aforementioned steps. For this purpose, however, sufficient resources in the form of computing power (CPU/GPU), memory space, and working memory must be present.

The object information a', . . . , e' and the statements made regarding the objects a, . . . , e are stored in the external unit 2 or in a memory unit of the Lidar system 11. Measurement is repeated at regular time intervals, for example in a range of several hours to several days. The time curve of the object information is recorded and analyzed by the logic controller in particular with regard to changes. For example, an analysis is made as to whether the fish stock has changed or whether the (mean) size and/or the weight of the fish has changed. Furthermore, the logic controller can calculate a prediction of increase or decrease in the fish stock. Moreover, the logic controller can recommend carrying out an action in the event that the prediction or change does not behave as desired. The operator can then carry out a suitable measure, for example the relevant change in water temperature or the variation in the frequency of the nutrient supply.

In the event that a large number of fish are located in the basin (see FIG. 1 on the right), interpretation of the spatial information 12 can be more difficult, for example, when two or more fish are located close to one another. In order to improve the analysis, the spatial information can be enriched with data from another sensor system. For example, an integrated or external camera can be used, which captures a photo or a video of the surroundings of the Lidar system 11.

In a modified exemplary embodiment, the Lidar system is used in a so-called precision farming (German: "Prazisionslandwirtschaft") application. Instead of detecting aquatic life forms as objects, agricultural products, for example fruits or animals, are detected and their stock or change in size is tracked over time. Depending on the change over time, the logic controller can suggest that water and nutrient supplies be decreased or increased for optimal development of the agricultural products.

Figure 2:
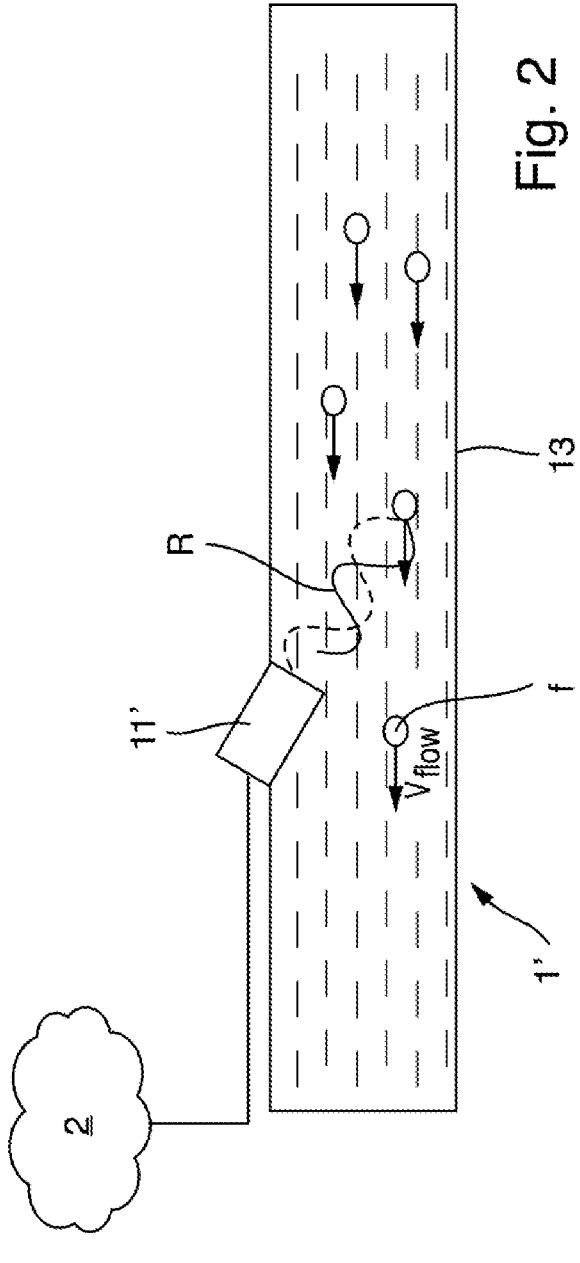
FIG. 2 shows a second exemplary embodiment of the method according to the present disclosure.

FIG. 2 shows that the Lidar system 11' is to be installed in or attached to a plant component 13—in this case a pipe—of a measuring point 1' of a process plant. A fluid measurement medium flows through the pipe 13. Alternatively, several different measurement media with different optical densities are located in the plant component, for example a tank. Phase boundaries f in the flowing measurement medium are identified as objects on the basis of the spatial information obtained by the reflections R. These phase boundaries f, which are, for example, gas bubbles (in the case of a flowing measurement medium) or suspended solids (in measurement media of different optical densities), or which are produced on account of different aggregation states (e.g., in the case of ice water as a fluid measurement medium), can be detected by the logic controller implemented in the external unit 2 in terms of quantity, shape, magnitude and/or local movement and observed over time. The measurement frequency must be selected to be very high for this purpose.

The logic controller can also execute other functions. For example, the latent energy can be deduced from the ratio of ice to water in a measured volume. It may, for example, also be provided to supply the operator of the process plant with information that an action for maintaining or influencing the process is to be carried out, for example cleaning a plant component 12, when gas bubbles, for example, are increasingly occurring.

Alternatively, the plant component 12 can be a conveyor belt on which bulk material (e.g., a harvested crop) is conveyed. By evaluating the spatial or object information, anomalies and foreign objects can be identified.

The invention claimed is:

1. A method for operating a measuring point in a process plant of process engineering, wherein the process plant includes at least one plant component that is a container, a channel, an open basin, or a pipe, wherein a LiDAR (light detection and ranging) system is used at the measuring point, the method comprising:

acquiring spatial information from within the at least one plant component using the LiDAR system;

extracting object information from the spatial information;

reconstructing and identifying objects on the basis of the object information, wherein the objects are phase boundaries of at least two different media or of at least two media having different optical densities;

associating the object information with the reconstructed and identified objects, wherein the object information is a content of gas bubbles or of suspended solids;

repeating the aforementioned method steps at predetermined time intervals and recording a time curve of the object information for each of the reconstructed and identified objects, wherein recording the time curve of the object information for each of the reconstructed and identified objects includes recording a change in shape and/or size over time of each of the reconstructed and identified objects;

analyzing the time curve of the object information; and determining a prediction based on the analysis of the time curve of the object information and determining and carrying out a process-related action based on the analysis of the time curve of the object information and/or the prediction.

2. The method according to claim 1, wherein an AI algorithm is used for reconstructing and identifying the objects, for analyzing the time curve of the object information, and/or for determining the action or the prediction.

3. The method according to claim 1, further comprising:

enriching the object information with information from at least one further sensor system, including a camera or a radar system.

4. The method according to claim 1, wherein the prediction contains a degree of change in a process quality.

5. The method according to claim 1, wherein the pre-specified time interval is in the order of magnitude of 0.1 ms to 10 s.

6. The method according to claim 4, wherein the process-related action includes supplying an operator of the process plant with information that a subsequent action for maintaining or influencing the process is to be carried out, including cleaning the at least one plant component, based on the change in the process quality.

\* \* \* \* \*